3,519,672
POLYHALOALKYLPOLYTHIOALKYL ESTERS AND ETHERS

Joseph E. Moore, Richmond, Calif., assignor to Chevron Research Company, San Francisco, Calif., a corporation of Delaware
No Drawing. Continuation-in-part of application Ser. No. 414,876, Nov. 30, 1964. This application Oct. 20, 1966, Ser. No. 588,009
Int. Cl. C07c *149/12, 154/00;* A01n *9/12*
U.S. Cl. 260—455                                8 Claims

ABSTRACT OF THE DISCLOSURE

Esters and ethers of the formula $$ROXS_mR'$$

wherein R' represents a polyhaloalkyl group having 1 to 2 carbon atoms and 3 to 5 halogens of atomic number 17 to 35, at least one of said halogens being bonded to the alpha carbon atom, X is alkylene of 1 to 4 carbon atoms and $m$ is an integer varying from 2 to 3, and R is an organic radical which forms an ester or ether with the remainder of the molecule. Typical R groups are hydrocarbyl, phosphoro, carbonyl, oxycarbonyl, sulfate and sufonate groups. These esters and ethers are useful as fungicides.

---

This application is a continuation-in-part of application Ser. No. 414,876, filed Nov. 30, 1964, now abandoned.

This invention relates to novel esters and ethers which contain a polyhalo(lower)alkylpolythioalkyl group and their use as fungicides.

The compounds of this invention may be represented by the general formula:

$$ROXS_mR'$$

where R' represents a polyhaloalkyl group having 1 to 2 carbon atoms and 3 to 5 halogens of atomic number 17 to 35, at least one of said halogens being bonded to the alpha carbon atom, X is alkylene of 1 to 4 carbon atoms, $m$ is an integer varying from 2 to 3, and R is an organic radical which combined with $OXS_mR'$ forms an ether or ester. Halogens of atomic number 17 to 35 are chlorine and bromine. The alpha carbon atom of the polyhaloalkyl group is bonded to a sulfur of the polysulfide ($S_m$) group.

X is an alkylene group of from 1 to 4 carbons, e.g., methylene, ethylene, trimethylene, tetramethylene, isopropylene, 1,3-butylene, etc. The RO group is bonded to a primary carbon, that is, the carbon bonded to oxygen has two hydrogens. Preferred alkylene groups contain 2 to 3 carbons.

The esters and ethers of this invention may be considered to be derivatives of alcohols. Thus, in a broad sense R is an organic radical which forms a bond with oxygen and may be cleaved on hydrolysis to regenerate the alcohol as follows:

$$ROXS_mS' + H_2O \rightarrow ROH + HOXS_mR'$$

The R groups do not contribute significantly to the biological activity of the compounds of this invention. However, they may provide a means for special application or more attractive physical properties, e.g., hydrophobic, lipophilic, etc.

The R groups which form esters or ethers with $OXS_mR'$ contain 1 to about 12 carbon atoms. Included among such groups are aliphatic and aromatic hydrocarbyl groups such as alkyl, alkenyl and phenyl, carbacyl, carbamoyl, O,O-dialkyl phosphoro, alkoxycarbonyl, thioalkoxycarbonyl, sulfate, sulfonate, borate and the like.

Among preferred R groups are the following:

(a)

where $R^2$ is a halohydrocarbyl group having 0 to 1 halogens of atomic number 17 to 35 and 1 to about 8 carbon atoms or a halohydrocarbylamino group having 0 to 1 halogen of atomic number 17 to 35 and 1 to about 8 carbon atoms, (b)

where Y is a chalcogen atom of atomic number 8 to 16, i.e., O and S, and $R^3$ is a halohydrocarbyl group having 0 to 1 halogen of atomic number 17 to 35 and 1 to about 8 carbon atoms or halophenythioalkyl in which the halogen is of atomic number 17 to 35, (c)

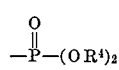

where $R^4$ is a hydrocarbyl group of 1 to about 6 carbon atoms, (d)

where $R^5$ is $OXS_mR'$ as defined above, (e)

where $R^6$ is $OXS_mR'$ as defined above or alkyl, or (f) alkyl of 1 to about 6 carbon atoms.

Examples of radicals which $R^2$ may represent are alkyl such as methyl, ethyl, hexyl and octyl, butenyl, phenyl, benzyl, tolyl; haloalkyl such as chloromethyl, chloroethyl, bromopropyl and chloroamyl, chloropropenyl, bromophenyl, chlorobenzyl, 4 - chloro-6-methylphenyl; alkylamino such as methylamino, ethylamino, butylamino, hexylamino and chlorobutylamino, chlorophenylamino, bromophenylamino, 6 - bromo-2-methyl-phenylamino and the like.

Examples of specific groups which $R^3$ may be are methyl, ethyl, isopropyl, hexyl, octyl, chloroethyl, chloropropyl, bromoamyl, chlorophenyl, bromobenzyl, chlorobutenyl, 6-chloro-2-methylphenyl, chlorophenylthioethyl, bromophenylthiopropyl, chlorophenylthiobutyl and the like.

Examples of $R^4$ are methyl, ethyl, propyl, hexyl, propargyl, butenyl and phenyl.

Illustrative of the novel compounds of this invention are the following compounds:

β-(trichloromethyldithio)ethyl benzoate;
β-(perchloroethyldithio)ethyl acetate;
β-(1,1,2-trichloroethyldithio)ethyl benzoate;
β-(1,1,2,2-tetrachloroethyldithio)ethyl N-ethylcarbamate;
β-(1,2,2,2-tetrachloroethyldithio)ethyl butyrate;
di-γ-(1,1,2-trichloroethyldithio)propyl carbonate;
γ-(1,1,2,2-tetrachloroethyldithio)propyl S-ethyl thiolcarbonate;
γ-(perchloroethyltrithio)propyl hexanoate;
di-[β-(1,2,2-trichloroethyldithio)ethyl] sulfate;
di-[β-(1,2,2,2-tetrachloroethyldithio)ethyl]sulfate;
ethyl β-(1,1,2-trichloroethyldithio)ethyl sulfate;
butyl γ-(1-chloro-2,2-dibromoethyl)dithio propyl sulfate;
di[β-(trichloromethyldithio)ethyl]sulfite;
di[γ-(1,1,2,2-tetrachloroethyldithio)propyl]sulfite;

O,O-dimethyl O-[β-(perchloroethyldithio)ethyl]phosphate;
O,O-dipropyl O-[β-(1,2,2-trichloroethyldithio)ethyl] phosphate;
O,O-di-phenyl O-[β-(1,1,2,2-tetrachloroethyldithio) ethyl]phosphate;
O,O-dimethyl O-[β-(perchloroethyldithio)propyl] phosphate;
methyl-β-(trichloromethyldithio)ethyl ether;
ethyl-γ-(1,1,2,2-tetrachloroethyltrithio)propyl ether;
amyl-γ-(perchloroethyldithio)propyl ether; and
hexyl-β-(tribromomethyldithio)propyl ether.

Applicant's novel compounds may be prepared according to general methods known in the art. The esters may be prepared by condensing an appropriate ω-polyhaloalkylpolythio alkanol with an appropriate acid. Acidic compounds such as acids, acid anhydrides, and acid halides may be used according to procedures known in the art. When desirable, transesterification may also be used. Etherification may be achieved with sulfate esters, active halogen compounds and the alkoxide of the ω-polyhaloalkylpolythio alcohol by methods known in the art. For making some of the compounds it may be preferable to prepare the oxygen derivative first and then contact the resulting mercaptan with the desired polyhaloalkylthio or thiosulfenyl halide.

The alcohol precursors of the compounds of this invention may be prepared by reacting a mercapto alcohol with a polyhaloalkylsulfenyl or -thiosulfenyl halide. Temperatures in the range of 0 to 50° C. may be used, but ambient temperatures or somewhat lower are preferred, that is, temperatures in the range of 0 to 25° C. Various solvents may be used in the reaction which are inert to the reactants and products. Preferred solvents are halogenated hydrocarbons.

The following examples are offered as illustrative of the methods of preparation of the novel compounds of this invention:

EXAMPLE I

A solution of 5.6 grams of 4-chlorophenylisocyanate, 10.0 grams of 2-hydroxyethyl 1,2,2,2-tetrachloroethyl disulfide, and one drop of dibutyl tin dilaurate in 50 mls. of dry benzene were allowed to stand for one week at room temperature. The solvent was removed by distillation, the product being heated to a maximum temperature of 100° C. at 0.4 mm. Twelve grams of 4-chlorophenylcarbamoyloxyethyl-1,2,2,2-tetrachloroethyl disulfide was obtained as an oil which slowly crystallized on standing.

*Analysis.*—Theory (percent): N, 3.3. Found (percent): N, 4.1.

EXAMPLE II

Into a flask fitted with condenser, thermometer, stirrer, and dropping funnel was introduced 8.5 grams of 1,1,2,2-tetrachloroethylsulfenyl chloride in 100 ml. carbon tetrachloride. Into the mixture cooled in an ice bath was added 3.3 grams of a 61% solution of 2-methoxyethyl mercaptan diluted with carbon tetrachloride. The mercaptan was added dropwise and very slowly. After addition was completed, the reaction mixture was refluxed for about 10 minutes. The mixture was then allowed to cool to room temperature and the solvent stripped under a water vacuum. The residue was distilled yielding 4 grams of methyl-β-(1,1,2,2-tetrachloroethyldithio)ethyl ether boiling in a range of 100° to 117° C. at 0.4 to 0.6 mm. mercury.

*Analysis.*—Theory (percent): Cl, 48.8; S, 22.1. Found (percent): Cl, 46.4; S, 23.7.

The following table, Table I, lists other compounds of this invention which were prepared according to general procedures known in the art.

TABLE I

| Structure | M.P., °C. | Cl Calc. | Cl Fd. | S Calc. | S Fd. | N or P Calc. | N or P Fd. |
|---|---|---|---|---|---|---|---|
| $CCl_3-S-S-CH_2CH_2O-\overset{O}{\underset{\|}{C}}-CH_3$ | | 39.4 | 34.3 | | | | |
| $CCl_3-S-S-S-CH_2-CH_2-O-\overset{O}{\underset{\|}{C}}-NHCH_3$ | | | | | | 4.4(N) | 3.8 |
| $CHCl_2-CHCl-S-S-CH_2-CH_2-O-\overset{O}{\underset{\|}{C}}-NH-\langle\phantom{o}\rangle-Cl$ | | 35.8 | 36.2 | | | 3.5(N) | 3.5 |
| $CHCl_2-CHCl-S-S-CH_2-CH_2-O-\overset{O}{\underset{\|}{P}}(OC_2H_5)_2$ | | 28.1 | 28.9 | 17.0 | 19.0 | | |
| $CCl_3-CHCl-S-S-CH_2-CH_2-O-\overset{O}{\underset{\|}{C}}-O-CH_2-CH_2-S-\langle\phantom{o}\rangle-Cl$ | | 36.2 | 36.8 | 19.7 | 19.9 | | |
| $CCl_3-CHCl-S-S-CH_2-CH_2-O-\overset{O}{\underset{\|}{C}}-S-C_2H_5$ | | 38.8 | 41.0 | 26.4 | 25.5 | | |
| $CCl_3-CHCl-S-S-CH_2-CH_2-O-\overset{O}{\underset{\|}{C}}-NH-\langle\phantom{o}\rangle-Cl$ | 58-63 | | | | | 3.4(N) | 4.1 |
| $CCl_3-CHCl-S-S-CH_2CH_2-O-\overset{O}{\underset{\|}{C}}-NHCH_3$ | | 42.5 | 40.3 | 19.3 | 18.6 | | |
| $CCl_3-CHCl-S-S-CH_2-CH_2-\overset{O}{\underset{\|}{P}}(OC_2H_5)_2$ | | 34.4 | 35.9 | 15.5 | 17.1 | 7.5(P) | 6.3 |

TABLE I—Continued

| Structure | M.P., °C. | Cl Calc. | Cl Fd. | S Calc. | S Fd. | N or P Calc. | N or P Fd. |
|---|---|---|---|---|---|---|---|
| $CCl_3-CHCl-S-S-CH_2-CH_2-O-\overset{O}{\underset{\|}{C}}-NH-\langle\text{phenyl}\rangle$ | 58–60 | 35.9 | 35.6 | 16.2 | 16.9 | | |
| $CCl_3-CHCl-S-S-CH_2-CH_2-O-\overset{O}{\underset{\|}{C}}-CH_2Cl$ | | 50.3 | 49.0 | 18.2 | 20.2 | | |
| $CHCl_2-CCl_2-S-S-CH_2-CH_2-O-\overset{O}{\underset{\|}{C}}-CH_3$ | | 44.6 | 43.3 | 20.1 | 20.5 | | |
| $CHCl_2-CCl_2-S-S-CH_2-CH_2-O-\overset{O}{\underset{\|}{C}}-O-CH_2-CH_2-S-\langle\text{phenyl}\rangle-Cl$ | | 36.2 | 35.0 | 19.7 | 20.0 | | |
| $CHCl_2-CCl_2-S-S-CH_2-CH_2-O-\overset{O}{\underset{\|}{C}}-S-\langle\text{phenyl}\rangle-Cl$ | | 39.6 | 34.9 | 21.5 | 23.3 | | |
| $CHCl_2-CCl_2-S-S-CH_2-CH_2-O-\overset{O}{\underset{\|}{C}}-S-C_2H_5$ | | 38.8 | 43.2 | 22.4 | 26.4 | | |
| $CHCl_2-CCl_2-S-S-CH_2-CH_2-O-\overset{O}{\underset{\|}{C}}-NH-\langle\text{phenyl}\rangle-Cl$ | | 41.3 | 39.2 | 14.9 | 15.6 | 3.3(N) | 3.1 |
| $CHCl_2-CCl_2-S-S-CH_2-CH_2-O-\overset{O}{\underset{\|}{C}}-NH-\langle\text{phenyl, Cl}\rangle$ | | 41.3 | 39.1 | 14.9 | 15.1 | | |
| $CHCl_2-CCl_2-S-S-CH_2-CH_2-O-\overset{O}{\underset{\|}{C}}-NHCH_3$ | | 42.5 | 40.1 | 19.3 | 19.9 | | |
| $[CHCl_2-CCl_2-S-S-CH_2-CH_2-O]_2S\overset{O}{\underset{O}{{\diagup\!\!\!\diagdown}}}$ | | 46.2 | 50.0 | 26.1 | 25.0 | | |
| $[CHCl_2-CCl_2-S-S-CH_2-CH_2-O]_2S \longrightarrow O$ | | 47.5 | 45.3 | 26.8 | 26.7 | | |
| $CHCl_2-CCl_2-S-S-CH_2-CH_2-O-\overset{O}{\underset{\uparrow}{P}}(OC_2H_5)_2$ | | | | | | 7.5 (P) | 5.7 |
| $CHCl_2-CCl_2-S-S-CH_2-CH_2-O-\overset{O}{\underset{\overset{\|}{O}}{\overset{\|}{S}}}-OC_2H_5$ | | 36.8 | 40.7 | 25.0 | 25.4 | | |
| $CHCl_2-CCl_2-S-S-CH_2-CH_2-O-CH_3$ | | | | | | | |

The novel compounds of this invention were tested for fungicidal activity against *Pythium ultimum* and *Rhizoctonia solani* by means of the mycelial drop test. This test is designed to measure the fungitoxic activity of fungicidal chemicals in terms of their degree of inhibiton upon mycelial growth.

Each fungitoxic compound to be tested was dissolved in acetone in dilutions as indicated in the following table. Paper discs previously inoculated by impregnation with equal amounts of a particular fungus mycelium and placed on potato dextrose agar medium were treated by applying a precise and equal volume of each of these fungicidal solutions to their center. Following treatment with the fungitoxic chemical, the discs were incubated along with inoculated but untreated control discs at ambient temperatures until such time as these untreated control discs were filled with mycelial growth. Activity of the fungitoxic chemical tested was determined by comparative measurements of radii of mycelial growth away from the edge of the disc in treated and untreated samples. From this comparison a percentage inhibition of growth area can be determined. The results are tabulated in columns I and II of Table II.

The novel compounds of this invention were also compared for fungicidal activity by means of "The Standard Spore Slide-Germination Method for Determining Fungicidal Activity." The results obtained are expressed in terms of percent inhibition of germination of fungus spores.

Each compound to be tested was dissolved in acetone in dilutions to the desired concentration. These solutions were then pipetted into the wells of depression slides and allowed to dry. The wells were filled with a spore suspension of the test organism, *Monilinia fructicola,* and incubated in a moist chamber overnight. A group of one hundred spores was examined and the number of spores germinated and not germinated was counted and recorded to show the biological activity in terms of the percentage germination inhibition.

The results of these tests for various chemicals of this invention on the particular fungus mycelium and spores are indicated as shown in column III of Table II.

Further, these compounds may not only be applied alone or in mixes with other compounds of the disclosed class, but may also be used in combination with other active toxicants in the formulation of fungicidal compositions.

The compounds may be applied to any environmental area which is a host to fungus or susceptible to fungus attack. For example, the fungicidal compositions may be sprayed or otherwise applied directly to a plant or other host, may be applied to the plant seed, sprayed upon the soil or other plant environment, or used in similar ways

TABLE II

| Structure | I Pythium | | II Rhizoctonia | | III Monilinia | |
|---|---|---|---|---|---|---|
| | P.p.m. | Percent | P.p.m. | Percent | P.p.m. | Percent |
| Cl₂HC—CCl₂—S—S—CH₂CH₂O—C(O)—CH₃ | 500<br>250<br>125 | 100<br>100<br>100 | 500<br>250<br>150 | 100<br>100<br>72 | 10<br>3<br>1 | 100<br>100<br>100 |
| Cl₂HC—CCl₂—S—S—CH₂CH₂O—C(O)—O—CH₂—CH₂—S—C₆H₄—Cl | 500<br>250 | 100<br>80 | 500 | 20 | 10<br>3 | 100<br>62 |
| Cl₂HC—CCl₂—S—S—CH₂CH₂O—C(O)—S—C₆H₄—Cl | 1,000 | 29 | 1,000 | 9 | 10<br>3 | 100<br>56 |
| Cl₂HC—CCl₂—S—S—CH₂CH₂O—C(O)—S—CH₂—CH₃ | 1,000<br>500<br>250 | 100<br>100<br>100 | 1,000<br>500<br>250 | 100<br>88<br>40 | 10<br>3 | 100<br>100 |
| Cl₂HC—CCl₂—S—S—CH₂CH₂O—C(O)—NH—C₆H₄—Cl | 500<br>250 | 100<br>100 | 500<br>250<br>125 | 100<br>33<br>11 | 10<br>3<br>1 | 100<br>100<br>48 |
| Cl₂HC—CCl₂—S—S—CH₂CH₂O—C(O)—NH—C₆H₄(Cl) (ortho-Cl) | | | | | 10<br>3 | 100<br>94 |
| Cl₂HC—CCl₂—S—S—CH₂CH₂O—C(O)—NH—CH₃ | 500<br>250<br>125 | 100<br>100<br>100 | 500<br>250<br>125 | 100<br>100<br>86 | 10<br>3<br>1 | 100<br>100<br>100 |
| (Cl₂HC—CCl₂—S—S—CH₂CH₂O)₂—S(=O)₂ | 500<br>250<br>125 | 100<br>100<br>100 | 500<br>250<br>125 | 94<br>38<br>22 | 10<br>3 | 100<br>100 |
| (Cl₂HC—CCl₂—S—S—CH₂CH₂O)₂—S | | | 1,000 | 100 | 10<br>3<br>1 | 100<br>67<br>30 |
| Cl₂HC—CCl₂—S—S—CH₂CH₂O—P(=O)(OC₂H₅)₂ | 500<br>250 | 100<br>79 | 500<br>250 | 80<br>55 | 10<br>3 | 100<br>100 |
| Cl₂HC—CCl₂—S—S—CH₂CH₂O—S(=O)—O—C₂H₅ | 1,000 | 100 | 1,000 | 100 | 10 | 100 |
| Cl₂HC—CCl₂—S—S—CH₂CH₂O—CH₃ | 1,000<br>500 | 100<br>100 | 1,000<br>500<br>250 | 1,000<br>78<br>15 | 10 | 100 |

Aside from the specific formulation and application of the class of compounds of the invention as represented by the foregoing test, these compounds may be dispersed in or upon other inert liquid and solid carriers such as inert clay, xylenes, etc. The solid carriers may be in the form of a dust, or used in conjunction with a suitable wetting agent to form a wettable powder. The fungitoxic compounds of this invention may also be formulated with other solvents, dispersing agents, or emulsifying agents.

so as to effect the control of fungus and fungus caused diseases.

I claim:
1. Compounds having the formula

where R′ represents a polyhaloalkyl group having 1 to 2 carbon atoms and 3 to 5 halogen atoms of atomic number 17 to 35, at least one of said halogens being bonded to the alpha carbon atom, X is alkylene of 1 to 4 carbon atoms, $m$ is in integer varying from 2 to 3 and R is (a)

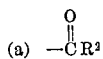

where $R^2$ contains 1 to about 8 carbon atoms and is hydrocarbyl, monohalohydrocarbyl in which the halogen is of atomic number 17 to 35, hydrocarbylamino or halohydrocarbylamino in which the halogen is of atomic number 17 to 35 or (b)

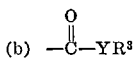

where Y is a chalcogen atom of atomic number 8 to 16 and $R^3$ is hydrocarbyl of 1 to about 8 carbon atoms, monohalohydrocarbyl of 1 to about 8 carbon atoms, in which the halogen is of atomic number 17 to 35 or halophenylthioalkyl in which the halogen is of atomic number 17 to 35 and the alkyl group contains 1 to about 5 carbon atoms.

2. The compounds of claim 1 where $m$ is 2.
3. The compounds of claim 1 where R' is 1,1,2,2,-tetrachloroethyl.
4. The compounds of claim 1 wherein R' is trichloromethyl.
5. The compounds of claim 1 where R is

and $R_2$ is alkyl, alkylamino, phenylamino, halophenylamino or haloalkyl.

6. The compounds of claim 1 weherin R is

and Y is a chalcogen atom of atomic number 8 to 16 and $R^3$ is alkyl, chlorophenyl or chlorophenylthioalkyl in which the alkyl group contains 1 to about 5 carbon atoms.

7. The compounds of claim 1 wherein R is

and $R^2$ contains 1 to about 8 carbon atoms and is alkyl, alkenyl, aryl, monochloroalkyl, monochloroaryl, alkylamino, arylamino, monochloroalkylamino or monochloroarylamino.

8. The compounds of claim 1 wherein R is

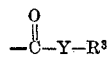

and Y is a chalcogen atom of atomic number 8 to 16 and $R^3$ is alkyl, monochloroalkyl, monochloroaryl or monochlorophenylthioalkyl in which the alkyl contains 1 to about 5 carbon atoms.

References Cited
UNITED STATES PATENTS

| | | | |
|---|---|---|---|
| 2,201,535 | 5/1940 | Harris | 260—458 X |
| 2,553,777 | 5/1951 | Hawley, et al. | 260—455 X |
| 2,560,421 | 7/1951 | Eby | 260—608 |
| 2,909,554 | 10/1959 | Doerr | 260—458 |
| 3,203,996 | 8/1965 | Moore | 260—608 |
| 3,294,760 | 12/1966 | Hay | 260—608 X |

CHARLES B. PARKER, Primary Examiner

D. R. PHILLIPS, Assistant Examiner

U.S. Cl. X.R.

260—487, 488, 463, 482, 471, 472, 476, 456, 458, 947, 608, 399; 424—215, 300, 309, 311, 312, 303, 336